United States Patent
Guntermann et al.

(10) Patent No.: US 11,095,182 B2
(45) Date of Patent: Aug. 17, 2021

(54) SEALING ARRANGEMENT FOR A DEVICE FOR DRIVING A COMPRESSOR AND DEVICE FOR DRIVING A COMPRESSOR

(71) Applicant: Hanon Systems, Daejeon (KR)

(72) Inventors: Bernd Guntermann, Lennestadt (DE); David Walisko, Hürth (DE); Stephan Heinrichs, Hürtgenwald (DE); Gerd Vondahlen, Gangelt (DE)

(73) Assignee: Hanon Systems, Daejeon (KR)

( * ) Notice: Subject to any disclaimer, the term of this patent is extended or adjusted under 35 U.S.C. 154(b) by 2 days.

(21) Appl. No.: 16/440,334

(22) Filed: Jun. 13, 2019

(65) Prior Publication Data
US 2019/0390679 A1 Dec. 26, 2019

(30) Foreign Application Priority Data

Jun. 20, 2018 (DE) .......................... 102018114823.2
Mar. 25, 2019 (DE) .......................... 102019107516.5

(51) Int. Cl.
*H02K 5/10* (2006.01)
*F04D 25/06* (2006.01)
(Continued)

(52) U.S. Cl.
CPC ........... *H02K 5/10* (2013.01); *F04D 25/0693* (2013.01); *H02K 5/04* (2013.01); *H02K 5/12* (2013.01); *F05B 2230/60* (2013.01)

(58) Field of Classification Search
CPC . Y10S 417/902; Y10S 439/926; H02K 5/225; H02K 11/00; H02K 5/22;
(Continued)

(56) References Cited

U.S. PATENT DOCUMENTS 4,117,254 A * 9/1978 Richter .................. H01B 17/30
174/15.3
4,461,925 A * 7/1984 Bowsky ............... H01B 17/305
174/152 GM
(Continued)

FOREIGN PATENT DOCUMENTS

CN 107709786 A 2/2018
JP 2013158143 A 8/2013
(Continued)

OTHER PUBLICATIONS

English Translation of Written Description of Kobayashi WO 2015/146677, Mar. 16, 2015.*

Primary Examiner — Edwin A. Leon
Assistant Examiner — Matthew T Dzierzynski
(74) Attorney, Agent, or Firm — Norton Rose Fulbright US LLP; James R. Crawford (57) ABSTRACT

Sealing arrangement for guiding an electrical connection through a wall of a housing for a device for driving a compressor having an electrically conducting connecting element, guided through a conical passage aperture of the housing, which at least regionally is fully enclosed over the entire circumference by a sealing element. Sealing element is formed as a hollow truncated cone and disposed between a conical sealing facing of the connecting element and a boundary surface of the passage aperture sealing the connecting element against the housing. The connecting element is disposed having been guided through a connection passage of a receiving member for receiving a plug housing with a wall into the plug housing. A device for driving a compressor of a gaseous fluid with the sealing arrangement and a method for assembling the device and use of the device are disclosed.

28 Claims, 3 Drawing Sheets

(51) Int. Cl.
*H02K 5/12* (2006.01)
*H02K 5/04* (2006.01)

(58) Field of Classification Search
CPC ............... F04C 2240/40; F04C 2240/803; F04C 23/02; H01B 17/303; H01B 17/30; H01B 17/301; H01R 13/521; H01R 4/70; H02G 3/088; H02G 3/22; H02G 15/013; H01L 317/303
See application file for complete search history.

(56) References Cited

U.S. PATENT DOCUMENTS

| | | | | |
|---|---|---|---|---|
| 4,984,973 A | * | 1/1991 | Itameri-Kinter | H01B 17/305 |
| | | | | 174/152 GM |
| 5,563,562 A | * | 10/1996 | Szwec | H01R 24/44 |
| | | | | 174/152 GM |
| 6,107,566 A | * | 8/2000 | Quadir | H01B 17/303 |
| | | | | 174/50.52 |
| 6,273,754 B1 | * | 8/2001 | Bunch | H01R 13/405 |
| | | | | 439/587 |
| 6,509,525 B2 | * | 1/2003 | Honkomp | H01B 17/303 |
| | | | | 174/152 GM |
| 7,094,968 B2 | * | 8/2006 | Motzigkeit | H02G 3/088 |
| | | | | 16/2.2 |
| 8,525,047 B2 | * | 9/2013 | Guntermann | H02G 3/22 |
| | | | | 174/652 |
| 8,957,327 B2 | * | 2/2015 | Ahire | B23K 1/0016 |
| | | | | 174/650 |
| 10,097,062 B2 | * | 10/2018 | Guntermann | H02K 5/225 |
| 10,575,447 B2 | | 2/2020 | Song et al. | |
| 2017/0054342 A1 | | 2/2017 | Guntermann et al. | |

FOREIGN PATENT DOCUMENTS

| | | |
|---|---|---|
| JP | 2014070578 A | 4/2014 |
| KR | 101738251 B1 | 5/2017 |
| KR | 20170120775 A | 11/2017 |
| KR | 20180023166 A | 3/2018 |
| KR | 20180028304 A | 3/2018 |
| WO | 2015/146677 A1 | 10/2015 |

* cited by examiner

SEALING ARRANGEMENT FOR A DEVICE FOR DRIVING A COMPRESSOR AND DEVICE FOR DRIVING A COMPRESSOR

This application claims priority from German Patent Application Nos. 102018114823.2 filed on Jun. 20, 2018 and 102019107516.5 filed on Mar. 25, 2019. The entire contents of these applications are incorporated herein by reference in their entirety.

FIELD OF THE INVENTION

The invention relates to a sealing arrangement for feeding an electric connection through a wall of a housing for a device for driving a compressor. The sealing arrangement comprises an electrically conducting connecting element fed through a conical passage aperture of the housing, which connecting element is at least regionally encompassed fully over its circumference by a sealing element. The sealing element is developed in the form of a hollow truncated cone and is disposed between a conical sealing surface of the connecting element and a boundary surface of the passage aperture, sealing the passage aperture of the connecting element against the housing.

The invention relates furthermore to a device as well as a method for assembling the device, in particular an electric motor, for driving a compressor for the compression of a gaseous fluid, specifically of a refrigerant. The compressor can be applied in the refrigerant circuit of a climate control system of a motor vehicle.

BACKGROUND OF THE INVENTION

Compressors known in prior art for mobile applications, in particular for climate control systems of motor vehicles, for the purpose of conveying refrigerant through a refrigerant circuit, also termed refrigerant compressors, are often, independently of the refrigerant, implemented as piston compressors with variable stroke displacement or as scroll compressors. The compressors are herein driven either by a belt pulley or by electric means.

Apart from the electric motor for driving the particular compression mechanism, electrically driven compressors comprise an inverter for driving the electric motor. The inverter serves for converting direct current of a motor vehicle battery or accumulator into alternating current which is supplied to the electric motor across electrical connections.

Conventional electric motors of electrically driven compressors are implemented with an annular stator core with coils disposed thereon and a rotor, wherein the rotor is disposed within the stator core. Rotor and stator are oriented along a common axis of symmetry or rotational axis of the rotor.

The inverter comprises plug connections for the electric connection of plug connectors, developed as separate components and pins, for the electrical connection with connections of the electric motor, which, in turn, are electrically connected with connection leads of conductor wires of the coils of the stator.

The connections of the electric motor are developed in a plug housing disposed at an end side of the stator oriented in an axial direction of the stator.

During the assembly of the compressor the plug connectors disposed on the inverter and implemented as pins are plugged into a connecting connection or connecting port provided in the plug housing and are each contacted with an end fitting, connected with a corresponding conductor wire, in particular of a connection lead of the conductor wire. The end fitting is herein electrically and mechanically connected with the connection lead of the conductor wire such that a low contact resistance is always ensured between the plug connectors of the inverter and the conductor wire. To ensure simultaneously an electric connection with high insulation resistance, for example between the connection leads of the conductor wires, the non-insulated ends of the connection leads or the conductor wires, also termed phase conductors, must be electrically insulated, specifically hermetically sealed, against one another and against other electrically conducting components of the stator as well as of the motor housing, since, for example the fluid flowing through the compressor, a mixture of refrigerant and oil, can decrease the insulation resistance between the plug connectors and the connecting ports or between the connecting ports and other, even inactive metal parts of the electric motor or of the motor housing. Moreover, the plug housing must be electrically insulated and hermetically sealed with respect to the plug connectors, projecting from the motor housing, and with respect to the inverter disposed outside of the motor housing. This must be carried out to ensure that no refrigerant flowing in the compressor and/or oil escapes into the surrounding and that no short-circuits or damages occur in the inverter, in particular on one of the components mounted on a board of the inverter.

WO 2015/146677 A1 discloses an electrically driven compressor with a compression assembly, an electric motor for driving the compression assembly and an inverter for supplying the electric motor with power. The electric motor comprises a rotor and a stator with an electrically insulating coil body disposed at an end of a stator core, coils disposed on the coil body and a plug housing with connecting ports for the electric connection of the coils with the inverter. The plug housing is mechanically connected on the coil body with the stator at an end side.

The preferably plastic-insulated connection leads of the discrete phases of the electric motor, developed as segments of the conductor wires, implemented in particular of lacquered copper wire, of the coils are always connected with the end fittings disposed in the plug housing. To seal off the interior of the plug housing against the motor, at the passage of each end fitting of a connection lead of a connection wire into the plug housing a separate sealing element, in particular a sealing ring, is provided. In addition, when using a two-part plug housing an additional seal is required for sealing the plug housing.

The plug connectors plugged in each instance into connecting ports provided in the plug housing are regionally jacketed with annular insulators which establish a connection to a hermetic plate.

There is, for one, a hermetic seal disposed between the plate and a partitioning wall of the motor housing and, for another, between each insulator and the plug housing, which means on the outer peripheries of the insulators of the plug connectors, there are provided electrically insulating, annular sealing elements. The plug connectors are placed, together with the insulators and the sealing elements, into openings developed in the plug housing such that the plug connectors are guided through the motor housing and are fluidically impermeable.

To ensure sufficient sealing functionality, in particular the sufficient sealing of the compressor against the surrounding and a sufficient insulation against the refrigerant flowing through the compressor as well as the adjacently disposed housing elements, the plug connectors are consequently assembled with a multiplicity of different sealing elements against the plug housing, which makes the arrangement of a large number of components as well as the assembly highly complex. Due to the use of the multiplicity of different components, moreover, the risk of malfunction and failure as well as defects is very high.

The invention addresses the problem of providing a sealing arrangement for a device. in particular an electric motor, for driving an electrically driven compressor of a gaseous fluid, which can be assembled in simple manner and thus time-savingly. The complexity of the structure of the sealing arrangement, and thus of the device, is to be minimized, with the sealing of the hermetic system against the surrounding as well as the electrical insulation against the interior of the compressors simultaneously being optimized. The arrangement is, furthermore, to be implemented toward increasing the insulation resistance of the system. Moreover, the service life with respect to aging in view of the insulation resistance is to be maximized. The arrangement is herein to comprise the least number of individual components as well as be constructionally simple to realize in an effort to minimize the costs of production also.

OBJECTS OF THE INVENTION

The problem is resolved through the subject matters with the characteristics of the invention described herein.

SUMMARY OF THE INVENTION

The problem is resolved through a sealing arrangement according to the invention for feeding an electrical connection through a wall of a housing for a device for driving a compressor. The sealing arrangement comprises an electrically conducting connecting element guided through a conical passage aperture of the housing which, at least regionally, is fully encompassed over the entire circumference by a sealing element. The sealing element has the form of a hollow truncated cone and is disposed between a conical sealing surface of the connection element and a boundary surface of the passage aperture, sealing the connecting element against the housing.

According to the concept of the invention, the connecting element is inserted through a connection passage of a receiving member for a plug housing with a wall into the plug housing. The sealing element comprises according to the invention a first sealing face as well as a second sealing face for sealing the connecting element against the housing and a third sealing face for sealing the connecting element against the wall of the receiving member.

According to a further development of the invention, the connecting element is developed as a pin-shaped plug connector with regions of different dimensions disposed along a common axis. The connecting element preferably has the form of a straight pin.

According to an advantageous embodiment of the invention, the connecting element is implemented rotationally symmetric to the axis with a first region, a second region and a third region. The first region and the second region have each a constant outer diameter. The third region is implemented in the shape of a truncated cone. The first region and the second region are each disposed such that they extend from one end of the connecting element to the third region, which means the first region and the second region extend each, starting from a distally disposed end side of the third region, in opposite directions.

The third region of the connecting element is preferably implemented in the form of a right circular truncated cone.

The lateral surface of the third region of the connecting element is preferably developed as a sealing facing with constant angle between a surface line and the axis of the connecting element.

A further advantage of the invention comprises that a diameter of a base area and a diameter of a top area of the truncated cone-shaped third region of the connecting element are in each instance greater than the diameter of the first region and the diameter of the second region of the connecting element. The diameters of the first region and of the second region can be identical.

According to a preferred embodiment of the invention, a first end side of the third region of the connecting element is disposed so as to be oriented toward an interior of the housing, while a second end side of the third region of the connecting element is disposed so as to be oriented toward a surrounding of the housing. The first end side of the third region is developed with a greater diameter than the second end side of the third region.

The plug connector is preferably disposed at least with a section of the first region within the plug housing, projecting with the second region from the housing and at least with a section of the third region located within the passage bore developed within the housing.

According to a further development of the invention, the sealing element is developed in the form of a right hollow circular truncated cone with an axis.

The sealing element is preferably disposed such that it is oriented with a first end side toward the interior of the housing and with a second end side toward the surrounding of the housing. The first end side is herein developed with a greater diameter than the second end side.

According to an advantageous embodiment of the invention, the sealing element has an outer surface of conical shape, which is developed as a first sealing face with constant angle between a surface line and the axis. The sealing element is preferably disposed such that it is in contact with the first sealing face on the housing.

The sealing element preferably comprises an inner surface with conical form, which is developed as a second sealing face with predetermined angle between a surface line and the axis. The angle between the surface line and the axis of the second sealing face can correspond to the angle between the surface line and the axis of the first sealing face such that the sealing element has at least in a section substantially a constant wall thickness. The sealing element is disposed such that it is preferably in contact with the second sealing face on the sealing face of the third region of the connecting element.

According to a further preferred embodiment of the invention, the sealing element comprises a third sealing face which is disposed in the proximity of a base area of the hollow circular truncated cone adjoining the second sealing face in the axial direction and has a lesser angle between a surface line and the axis than does the second sealing face. The third sealing face of the sealing element advantageously projects beyond the third region of the plug connector in the direction toward the wall of the receiving member. The sealing is disposed in contact with the third sealing face preferably on an outer side of the wall of the receiving member.

The sealing element can be implemented of a thermoset material in order to ensure on the sealing faces in each instance an electrically insulating and hermetically sealing connection.

According to a further development of the invention, the wall encompassing the connection passage of the receiving member is oriented in an axial direction toward the housing, and projects from the receiving member.

The wall is preferably developed in the form of a hollow circular cylinder and connected with a first end with the receiving member over its entire circumference.

A further advantage of the invention comprises that the wall comprises in a region of a second end, distal to the first end, on an outer side a beaded rim-like shaping which extends over the entire circumference about the wall. With the third sealing face the sealing element is herein preferably in contact on the outer side of the wall and encompasses the beaded rim-like shaping completely.

According to a further advantageous embodiment of the invention, the wall comprises on an inner side centering guides for the centered guidance of connecting elements through the connection passage. The centering guides are disposed such that they extend in the axial direction and project in the direction of an axis of the wall.

On a wall at least three centering guides are provided that are uniformly distributed over the circumference.

The wall can, furthermore, be developed on the second end on an inner side with an inserter guide, preferably in the form of a chamfer, for inserting the connecting elements.

The connecting element and the sealing element can be built either as a single part or as two parts, which means they can be connected with one another and thus form a common component or they can be built separately from one another. If the connecting element and the sealing element are built separately from one another, the components are connected with one another during the assembly. The sealing element is in that case slid as a separate component over the electrically conducting connecting element. If the two elements are implemented as a unitary part, the sealing element of an insulation material is sprayed around the connecting element and is connected with the connecting element.

The problem is also resolved through a device, in particular an electric motor, according to the invention for driving a compressor of a gaseous fluid. The device comprises a rotor and a stationary stator, extending along a common longitudinal axis, as well as a housing.

The stator is advantageously positioned in the radial direction on an outer side of the rotor such that it encompasses the rotor.

According to the concept of the invention, a support member with at least one receiving member is in contact on a first end side, oriented in an axial direction, of the stator. The receiving member comprises at least one connection passage with a wall for receiving at least one connecting element. The device is furthermore developed with an above described sealing arrangement according to the invention.

By axial direction is herein to be understood the direction of the longitudinal axis of the stator, which also corresponds to the longitudinal axis and the rotational axis of the rotor. An end side oriented in the axial direction is disposed in a plane oriented perpendicularly to the longitudinal axis.

One advantage of the invention comprises that the support member and the at least one receiving member for the at least one plug housing are developed as a coherent unit and a unitary component such that the receiving member is a constituent of the support member. The support member is thus developed as a multifunctional component, in particular of the stator. The problem is also resolved through a method according to the invention for assembling the device, in particular an electric motor, for driving a compressor of a gaseous fluid. The method comprises the following steps:

pressing at least one sealing element and one plug connector into a truncated cone-shaped passage aperture developed in a housing as well as introducing the at least one plug connector starting from an upper side of a receiving element through at least one connection passage developed in the receiving member into a connection of a plug housing disposed in a receiving member during the assembly of a stator with a support member in the housing, wherein in each instance a wall of the receiving member encompassing the connection passage is slid into the sealing element such that the sealing element encompasses the wall over the entire circumference.

According to a further development of the invention the wall of the receiving member with a beaded rim-like shaping, developed on an outer side, is slid into the sealing element such that the sealing element is fully in contact with a sealing face on the shaping and the sealing face encompasses the shaping.

During the assembly of the device a rotor and the stator are preferably disposed on a common longitudinal axis such that the stator encompasses the rotor in the radial direction.

According to an advantageous embodiment of the invention, a support member with the receiving member is disposed on a first end side, oriented in an axial direction, of the stator.

The plug housing is preferably introduced into the receiving member developed on the support member and in this manner fixed on the support member.

The advantageous embodiment of the invention enables the utilization of the device, in particular an electric motor, for driving a compressor for the compression of a gaseous fluid for a compressor of a refrigerant in a refrigerant circuit of a motor vehicle climate control system.

In summary, the sealing arrangement according to the invention, or the device according to the invention for driving a compressor of a gaseous fluid with the sealing arrangement comprise further diverse advantages:

minimal number of components since, for example, due to the use of the connecting element in combination with the sealing element and the wall developed on the support member, one or several, depending on the number of connecting elements, separate sealing elements as well as additional securement means are omitted in comparison to arrangements of prior art, wherein, moreover, the wall is produced in one injection molding process together with the support member, simple mounting, in particular when inserting the stator with the rotor within the housing since, in particular, no additional sealing elements for sealing off the connection passages as openings in the receiving member for guiding the connecting elements are required and 'squeezing' the stator into the housing as well as the sealing take place within the same mounting step, hermetic and electrically insulating sealing, in particular of connecting ports of the plug housing within the receiving member with the connecting elements, which increases the insulation resistance.

Further details, characteristics and advantages of the embodiments of the invention will be evident based on the following description of embodiment examples with reference to the associated drawing.

Figure 1A:
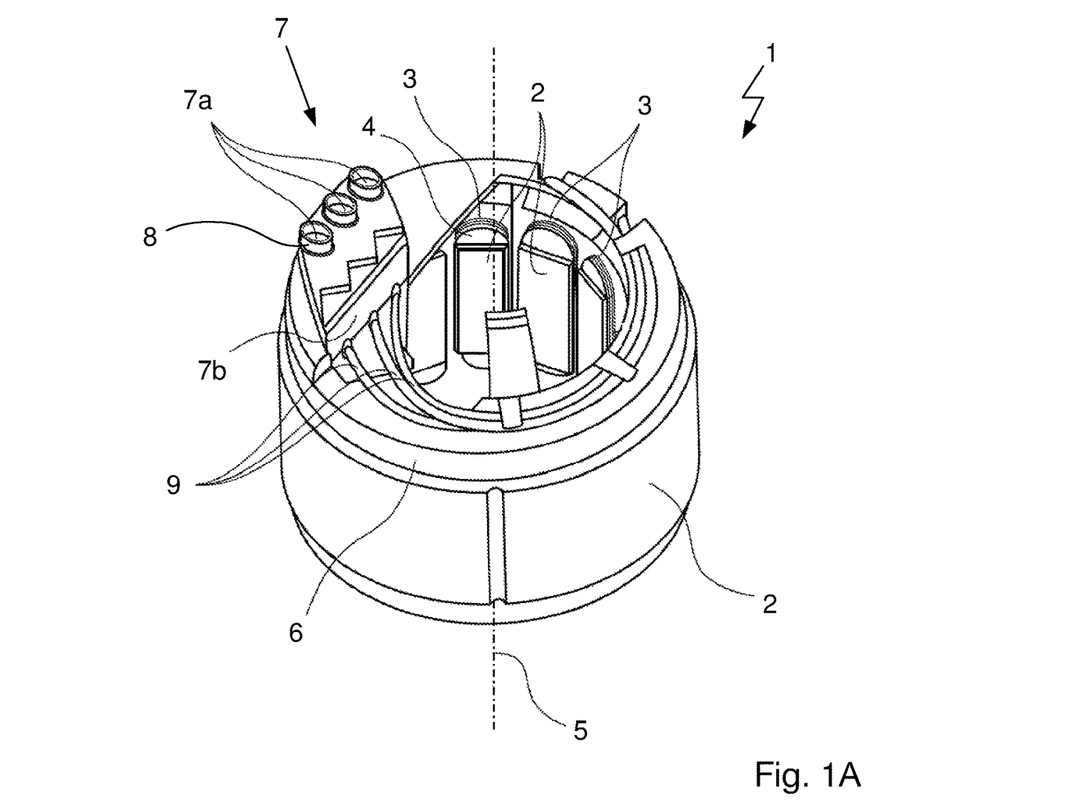
FIG. 1A: a stator of an electric motor as a device for driving a compressor of a gaseous fluid with a stator core, coils, an insulation element and a support member in a perspective view, as well as FIG. 1B a sector of the support member from FIG. 1A with a receiving member for a plug housing in a perspective detail view.
Figure 1B:
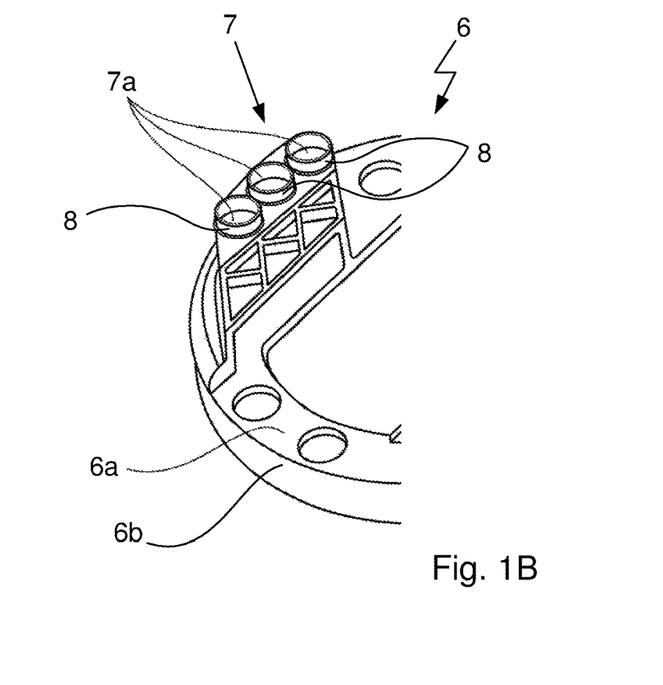

FIG. 1A depicts in perspective view a stator 1 of an electric motor as a device for driving a compressor of a gaseous fluid, specifically for a climate control system of a motor vehicle for the conveyance refrigerant through a refrigerant circuit. The stator 1 is implemented with a stator core 2, coils 3, an insulation element 4 as well as a support member 6 with a receiving member 7 for a plug housing 7b. FIG. 1B shows a sector detail of the support member 6 with the receiving member 7 with connection passages 7a for the plug housing 7b with connecting ports in a perspective detail view.

The electric motor, for example a three-phase alternating current motor, comprises a not depicted rotor and the stator core 2 disposed in the radial direction on an outer side of the rotor and thus disposed about the rotor. The stator core 2 preferably implemented as a laminated sheet package and the insulation element 4 implemented of an electrically insulating material extend along a longitudinal axis 5, which also corresponds to the longitudinal axis of stator 1 and the rotational axis of the rotor, from a first end side to a second end side of stator 1.

Coils 3 are each implemented of a wire, wound about the radially inwardly extending region of stator core 2, as an electrical conductor, also termed conductor wire 9. The non-wound ends of the conductor wires 9 are brought out of the particular winding as connection leads. In the proximity of the coils 3 the conductor wires are advantageously implemented of lacquer-coated and wound copper wire with the non-wound ends of the conductor wires as connection leads brought out of the particular winding and preferably being insulated by synthetic material coating.

The regions, extending inwardly in the radial direction, of the stator core 2 have the form of a web and are positioned uniformly distributed over the circumference of an outer wall of stator core 2. Between the conductor wires 9 of coils 3 and the particular regions of stator core 2 is disposed the insulation element 4 that electrically insulates stator core 2 and conductor wires 9 of coils 3 against one another. The insulation element 4 in each instance is implemented such that, at the ends of the webs oriented inwardly and in the axial direction, it widens in the axial direction. The end segments projecting in this manner of the insulation element 4 serve for fixing the conductor wires 9 of coils 3 wound about the webs of stator core 2.

The stator core 2, the insulation element 4 and the coils 3 form the stator unit of the electric motor.

At the first end side of stator 1 is disposed the support member 6 with a receiving member 7 with connection passages 7a for the plug housing 7b with connecting ports. The connecting ports of plug housing 7b serve in each instance as constituents of an electrical connection between the coils 3 of the electric motor and the inverter, in particular of electrically conducting pin-shaped connecting elements, also termed plug connectors, which, after having been guided through the connection passages 7a of the receiving member 7 of the support member 6, are disposed plugged into the connecting ports of the plug housing 7b.

The connection leads of conductor wires 9 of coils 3 and the connecting ports of the plug housing 7b disposed in the receiving member 7 are electrically connected with one another.

In the assembled state of stator 1, the support member 6 with the receiving member 7 as well as the plug housing 7b disposed in the receiving member 7 is in contact in the axial direction, on the one hand, on stator 1, in particular on stator core 2, and, specifically in the axial direction, is disposed on stator 1. The outer diameter of the support member 6 is herein less than the outer diameter of the stator core 2.

The support member 6 comprises, furthermore, a radially oriented circular ring-form annular surface 6a, in particular a sector of a circular ring-form annular surface, as well as an axially oriented cylinder-form, in particular hollow cylinder-form, annular surface 6b, which are in contact on one another on outer side edges and are connected with one another. The receiving member 7 for the plug housing 7b is implemented as a subregion of the radially oriented annular surface 6a and thus as a constituent of the support member 6.

The support member 6 comprises, furthermore, a radially oriented circular ring-shaped annular surface 6a, in particular a sector of a circular ring-shaped annular surface, as well as an axially oriented cylindrical, in particular hollow cylindrical, annular surface 6b, which are connected with one another at outer side edges adjoining one another. The receiving member 7 for the plug housing 7b is implemented as a subregion of the radially oriented annular surface 6a and is therefore implemented as a constituent of the support member 6.

The hollow cylindrical wall of the axially oriented annular surface 6b of the support member 6 is of such form that an outer diameter is less than the outer diameter of the outer wall of stator core 2 and such that an inner diameter is greater than the inner diameter of the outer wall of stator core 2.

The receiving member 7 for the plug housing 7b is developed as a constituent of the support member 6. The support member 6 with the radial annular surface 6a, the axial annular surface 6b and the receiving member 7 with the connection passages 7a for the plug housing 7b with the connecting ports is implemented as a unit, in particular as a single-part injection molded unit. The implementation as a single-part unit is realized within a molding process.

Similar to a system of drawers, the plug housing 7b is slid into the receiving member 7 through an end side and, consequently, is fully encompassed by the receiving member 7. Only the at least one of the end sides of the enclosure is open. The connection passages 7a are provided within the housing of the receiving member 7 to introduce the connecting elements as electrical connectors to the inverter through the enclosure of the receiving member 7 and into the plug housing 7b. The connection passages 7a are oriented in the axial direction.

Each connection passage 7a of receiving member 7 for receiving a plug connector is developed with a wall 8 extending in the axial direction. Each wall 8 has the form of a hollow circular cylinder which projects in the area of the connection passage 7a from the enclosure of the receiving member 7 encompassing the plug housing 7b. The wall 8 is developed in the proximity of the connection passage 7a about the circular connection passage 7a as a constituent of the receiving member 7, in particular the enclosure of the receiving member 7, encompassing the plug housing 7b. The wall 8 of the connection passage 7a is consequently connected with a first end, oriented in the axial direction, or a first end side, about the connection passage 7a, with the enclosure of the receiving member 7.

At the second end, implemented distally to the first end, the wall 8 comprises on the inner side a chamfer extending fully over the circumference, which facilitates the introduction of the connecting element into the wall 8 and thus into the connection passage 7a. On the outer side of wall 8 is provided in the proximity of the second end a beaded rim-like shaping that extends fully about the wall 8. The shaping and the chamfer are preferably developed in a plane oriented perpendicularly to the axial direction.

Figure 2:
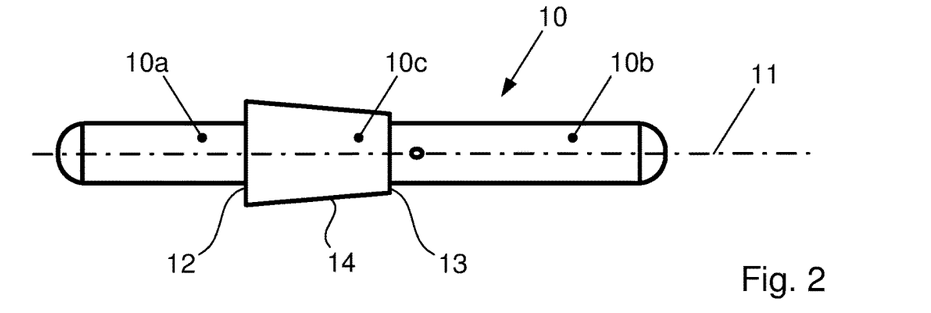
FIG. 2: a connecting element for the electric connection of connecting ports disposed in the plug housing with connectors of an inverter.

In FIG. 2 is shown a connecting element 10, in particular a plug connector 10, for the electrical connection of connecting ports implemented in the plug housing 7b, as components of stator 1 with connections of an inverter.

The plug connector 10 having the form of a straight pin is developed with three different regions 10a, 10b, 10c, that are disposed along a common axis 11, in particular a rotational axis. A first region 10a and a second region 10b, are implemented having substantially equal and constant outer diameters extending from one end of the pin toward the middle. A third region 10c has the form of a truncated cone, in particular of a right circular truncated cone, wherein the diameter of the base area of the truncated cone, as well as also the diameter of the top area of the truncated cone, are greater than the diameter of the first region 10a or the diameter of the second region 10b.

A first end side 12 of the third region 10c of the plug connector 10, that corresponds to the base of the truncated cone, is oriented in the direction of the first region 10a, which consequently extends from a first end of the pin up to the first end side of the third region 10c. In the mounted state of the device, the first region 10a of the plug connector 10 faces the support member 6 and thus the electric motor.

A second end side 13 of the third region 10c of plug connector 10, corresponding to the top area of the truncated cone, is oriented in the direction of the second region 10b, which consequently extends from a second end of the pin up to the second end side of the third region 10c. When the device is mounted, the second region 10b of the plug connector faces the inverter.

The lateral surface of the truncated cone-shaped third region 10c is implemented with a conical form as a sealing facing 14 with a predetermined and constant angle between surface line and cone axis. The first end side 12 is herein oriented with the greater diameter, which means the cone under side, toward the support member 6, while the cone upper side as the second end side 13 with the lesser diameter is oriented toward the inverter.

Plug connector 10 is provided with the third region 10c and the sealing facing 14 for the sealing of the plug connector 10 with respect to a not depicted housing of the electric motor in connection with a sealing element.

Figure 3A:
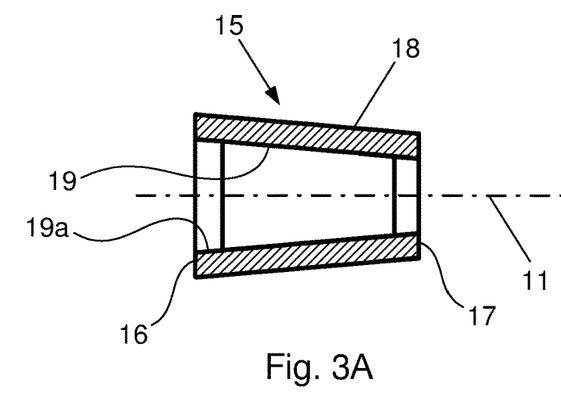
FIGS. 3A and 3B: a sealing element for sealing the connecting element with respect to a housing of the electric motor and with respect to the support member, in a side view as well as top view.
Figure 3B:
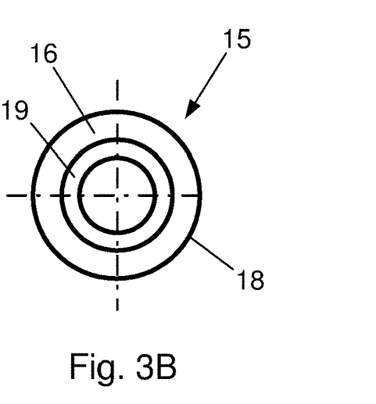

In FIGS. 3A and 3B is shown a sealing element 15 for sealing the connecting element 10 with respect to the not depicted housing of the electric motor and with respect to the support member 6, in particular to the wall 8 of the connection passage 7a, as a constituent of a sealing arrangement in a lateral view as well as a top view.

The sealing element 15 has the form of a hollow truncated cone, in particular of a right circular truncated cone jacket, with a substantially constant wall thickness. A first end side 16 of the sealing element 15, which corresponds to the base of the hollow truncated cone, in the mounted state of the sealing arrangement of the device faces the support member 6 and thus the electric motor, while a second end side 17 of the sealing element 15, which corresponds to the top area of the hollow truncated cone, in the mounted state of the sealing arrangement of the device, faces the inverter.

The outer lateral surface, or the outer surface 18 of the hollow truncated cone-form sealing element 15, with a conical shape is developed as a first sealing face 18 with predetermined and constant angle between surface line and cone axis. As is the case in the disposition of the plug connector 10, in particular of the third region 10c of plug connector 10, the cone is herein oriented with the greater diameter, which means the cone under side, oriented toward the support member 6, while the cone upper side with the lesser diameter is oriented toward the inverter. In addition, the inner surface 19 of the hollow truncated cone-form sealing element 15 is developed with a conical form as a second sealing face 19 with predetermined angle between surface line and cone axis. The angles between the particular surface line of the outer surface 18 as well as the inner surface 19 and the cone axis are substantially identical.

However, the inner surface 19 at the cone under side, or at the base of the hollow truncated cone, comprises a subregion as a third sealing face 19a with a lesser angle between surface line and cone axis, also termed cone angle or opening cone angle than the remaining inner surface.

The electrically insulating and fluidically, in particular hermetically, sealing element 15 is provided with the first sealing face 18 for the sealing contact on the housing of the electric motor, with the second sealing face 19 for the sealing contact on the sealing facing 14 of the third region 10c of the connecting element 10 and with the third sealing face 19a for the sealing contact on a wall 8 of a connection passage 7a of support member 6. The cone angle of the first sealing face 18 of sealing element 15 corresponds herein to a (opening) cone angle passage aperture through the housing of the electric motor, while the cone angle of the second sealing face 19 of sealing element 15 corresponds to the cone angle of the sealing facing 14 of the third region 10c of the connecting element 10.

The sealing element 15 is preferably developed of a thermoset material for the electrical insulation between the plug connector 10 and the housing of the electric motor. In addition, therewith, for example deformations are compensated that are caused by internal pressure as well as thermal expansion of the housing of the electric motor.

Figure 4A:
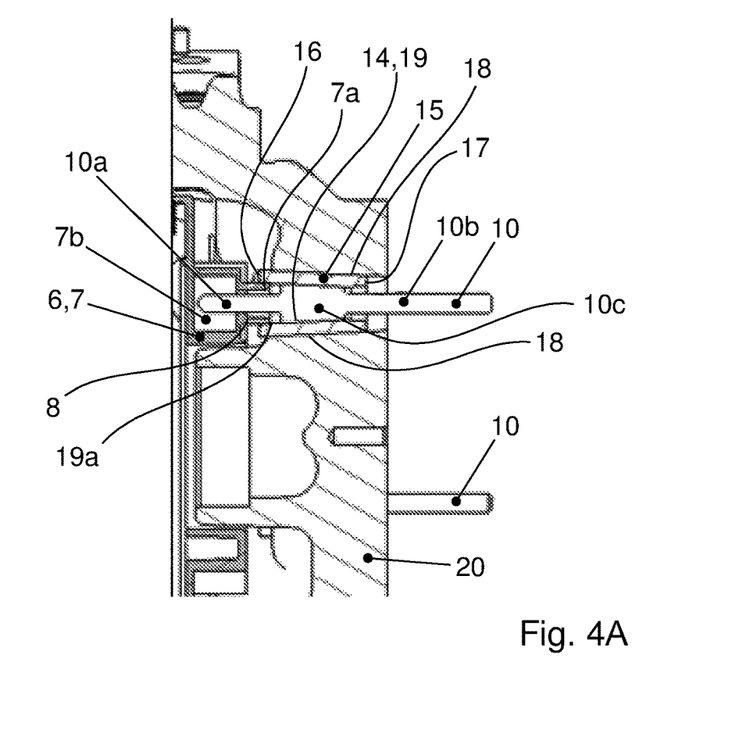
FIG. 4A: a connecting element from FIG. 2 with a sealing element from FIG. 3A in the mounted state of the electric motor in a cross section.
Figure 4B:
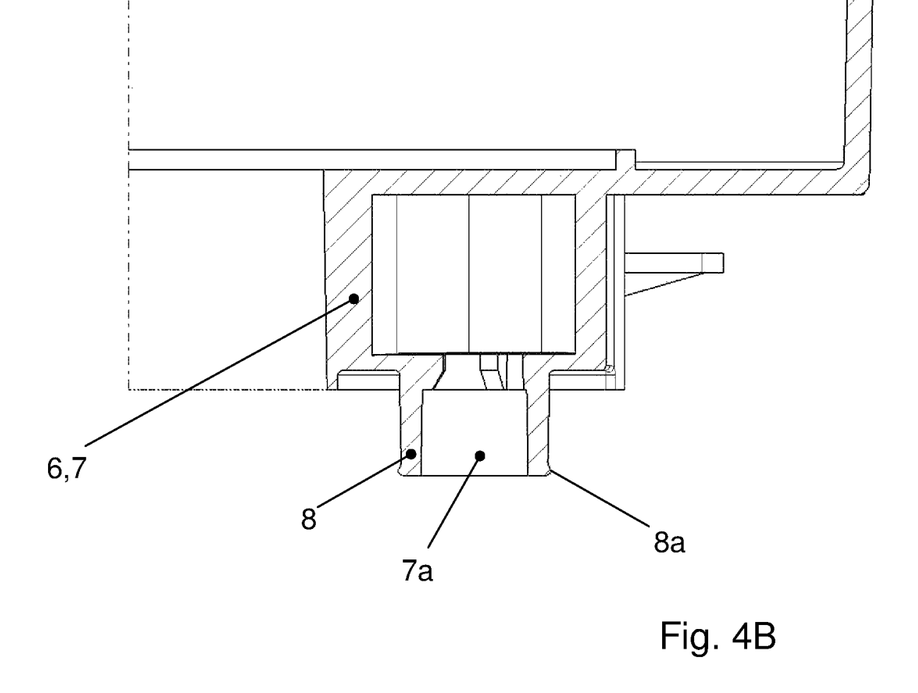
FIG. 4B: A cutaway detail of the support member in a sectional representation through a wall forming a connection passage.

FIG. 4A shows in cross section a connecting element 10 of FIG. 2 with a sealing element 15 from FIG. 3A in the mounted state of the sealing arrangement of the device, in particular the electric motor. The stator with the support member 6 is disposed within the housing 20 of the electric motor. The plug housing 7b is, in addition, slid into the receiving member 7 of the support member 6. FIG. 4B shows a cutaway detail of the support member 6 in a sectional representation through a wall 8 forming a connection passage 7a.

The wall 8 of the connection passage 7a projects from the receiving member 7 and is oriented in the axial direction toward the housing 20. The plug connector 10 is disposed with the first region 10a within the plug housing 7b, while the second region 10b of plug connector 10 projects out of the housing 20. The third region 10c of plug connector 10 is fixed within a passage bore implemented in the housing 20. Between the sealing facing 14 of the third region 10c of the plug connector 10 and the inner surface of the passage bore of the housing 20, the sealing element 15 is disposed which, with the outer surface 18 as the first sealing face 18, is in contact on housing 20 and with the inner surface 19 as the second sealing face 19 is in contact on the sealing facing 14 of the third region 10c of the plug connector 10. Therewith the space between the plug connector 10 and the housing 20 is sealed off.

The sealing element 15 with the third sealing face 19a that projects beyond the third region 10c of the plug connector in the direction of the support member 6 and is developed with a lesser cone angle than the inner surface 19 itself, furthermore, is in contact on the outer side of wall 8 of support member 6 on the support member 6. The sealing element herein fully encompasses the beaded rim-like shaping 8a, developed on the outer side of wall 8, over the entire circumference such that the sealing element 15 also seals off the connection passage 7a of receiving member 7 and therewith the plug housing 7b disposed within the receiving member 7. The sealing arrangement with sealing element 15 and plug connector 10 consequently serves in connection with the receiving member 7, or the support member 6 and the housing 20, for one, for sealing the interior of the electric motor with the stator and the rotor, which means of the interior of housing 20 with respect to the surrounding as well as, for another, for sealing and insulating the plug connectors, or connections to the interior of the housing 20, disposed within the plug housing 7b, and thus with respect to the fluid flowing in housing 20.

The walls 8, disposed projectingly on the support member 6 in the direction of the inverter about the connection passages 7a for the plug connectors 10, are developed such that the outer diameter is less than the inner diameter of the sealing element 15 in the proximity of the third sealing face 19a and greater than the outer diameter of the truncated cone-form third region 10c of the plug connectors 10 in the proximity of the first end side 12. At the free second end of the wall 8, also termed sealing channel, there is furthermore provided an insertion guide, preferably in the form of a chamfer such that sliding the wall 8 with the beaded rim-like shaping 8a into the sealing element 15 is facilitated.

Before mounting the stator 1 in the housing 20 of the motor, the sealing elements 15 and the plug connectors 10 are pressed into the truncated cone-form passage apertures developed in each instance with a small (opening) cone angle in housing 20. In the final position of the plug connector 10 the conically tapering diameter of the third region 10c of plug connector 10 is so small that a sufficiently large pressing power is applied over the entire circumference onto the housing 20 and the sealing function is generated. The sealing impermeability of the arrangement consequently results through the pressing of the plug connector 10 with the truncated cone-form third region 10c into the conically developed passage aperture of housing 20, wherein between the involved components plug connector 10, sealing element 15 and housing 20 a high surface pressure is effected. The (opening) cone angles of the components in contact on one another are dimensioned for forming a self-locking interference fit assembly that generates the requisite pressing forces. The pressure generated during operation of the device, due to the pressure difference occurring between the volume enclosed by housing 20 and the surrounding of housing 20, acts in the direction of the force predominating in the interference fit assembly.

During the mounting of stator 1 in housing 20 of the motor the plug connectors 10, starting from the upper side of support member 6 are inserted through the connection passages 7a into the connections of the plug housing 7b. When inserting the plug connectors 10 through the connection passages 7a into the receiving member 7, the wall 8 of support member 6 with the beaded rim-like shaping 8a is slid through the first end side 16, specifically in the proximity of the third sealing face 19a, into the sealing element 15 into the final position. By means of the insertion guide developed on wall 8 the simple positioning and mounting of wall 8 with respect to the sealing element 15 is enabled. In the mounted state of the sealing arrangement, the region of the third sealing face 19a of sealing element 15 is disposed such that it overlaps the beaded rim-like shaping 8a of the wall 8. The outer diameter of the shaping 8a is herein reduced and the wall 8 is compressed such that a permanent sealing function is ensured between the wall 8 and the sealing element 15.

Apart from a press fit of the plug connector 10 in the passage aperture of housing 20 in combination with the wall 8 of support member 6, with the implementation of the sealing element 15 consequently also a press fit for sealing the plug housing 7b is enabled, for example, for preventing the penetration of refrigerant and oil without the use of separate seals. With the wall 8 and the conical sealing element 15 consequently a hermetic seal of the interface between the plug connector 10 and the support member 6, and therewith the plug housing 7b, or the connecting ports in the plug housing 7b, is realized which also significantly raises the insulation resistance and prevents electrical connections between the conductor wires 9 as motor phases with one another and/or with other metal housing elements.

Exclusively by using the support member 6 with the wall 8, developed as sealing channel and the special form of the plug connector 10 in connection with only one sealing element 15, therewith the complete, or hermetic, sealing as well as an electric insulation of the interface between the plug connector 10 and the plug housing 7b, or the wall 8 of the connection passage 7a of support member 6, is ensured.

Figure 5A:
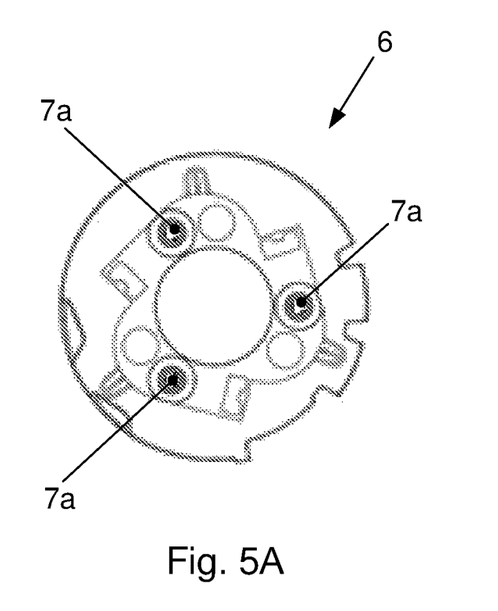
FIG. 5A: an alternative implementation of the support member with connection passages for receiving connecting elements in a top view as well as FIG. 5B: A detail of the support member from FIG. 5A with a connection passage for receiving a connecting element in a top view.
Figure 5B:
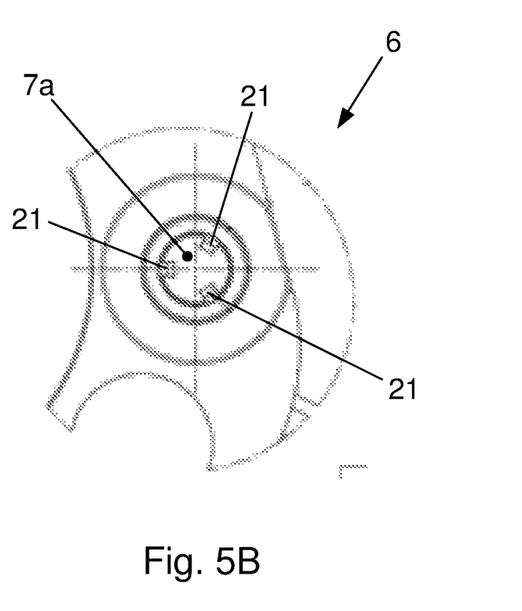

FIGS. 5A and 5B show an alternative implementation of the support member 6 with connection passages 7a for receiving connecting elements 10 in top view. The support member 6 comprises, by example, three receiving members, spaced apart from one another and each for receiving one plug housing, for receiving only one connecting element 20, instead of a plug housing 7b for receiving three connecting elements 10 according to FIGS. 1a and 1b. Herein in each instance one connection lead of a conductor wire is received in each plug housing. In FIG. 5B specifically a detail of the support member 6 from FIG. 5A with a connection passage 7a for receiving a connecting element is shown in top view.

To facilitate the assembly of the sealing arrangement, the wall 8 in each instance disposed about the connection passage 7a comprises on the inner side, in addition to the chamfer developed fully about the circumference, centering guides 21 which overall facilitate the insertion of the connecting element 10 into the wall 8, or into the connection passage 7a, as well as the placement of the sealing element 15 over the end side of the wall 8 onto the wall 8. The webs, extending in the axial direction developed projectingly in the direction of the center axis of wall 8 of the connection passage 7a and as centering guides 21, enable the straight-line insertion of the plug connector 10 into the support member 6. At least three centering guides 21 are provided which are disposed uniformly distributed over the circumference.

LIST OF REFERENCE NUMBERS

1 Stator
2 Stator core
3 Coil
4 Insulation element
5 Longitudinal axis
6 Support member
6a Radial annular surface
6b Axial annular surface
7 Receiving member
7a Connection passage
7b Plug housing
8 Wall, connection passage 7a
8a Shaping
9 Conductor wire
10 Connecting element, plug connector
10a First region
10b Second region
10c Third region
11 Axis
12 First end side, third region 10c, connecting element 10
13 Second end side, third region 10c, connecting element 10
14 Sealing facing, third region 10c, connecting element 10
15 Sealing element
16 First end side, sealing element 15
17 Second end side, sealing element 15
18 Outer surface, first sealing face, sealing element 15
19 Inner surface, second sealing face, sealing element 15
19a Third sealing face, sealing element 15
20 Housing
21 Centering guide, wall 8, connection passage 7a

What is claimed:

1. A sealing arrangement for guiding an electrical connection through a wall of a housing for a device for driving a compressor, comprising an electrically conducting connecting element, guided through a conical passage aperture of the housing, which at least regionally is fully enclosed over the entire circumference by a sealing element, wherein the sealing element is developed in the form of a hollow truncated cone and is disposed sealingly between a conical sealing facing of the connecting element and a boundary surface of the passage aperture, sealing the connecting element with respect to the housing, wherein the connecting element is disposed, having been guided through a connection passage of a receiving member for receiving a plug housing with a wall, into the plug housing and the sealing element comprises a first sealing face as well as a second sealing face for sealing the connecting element against the housing and a third sealing face for sealing the connecting element against the wall of the receiving member;
wherein the wall encompassing the connection passage of the receiving member is disposed such that it is oriented in an axial direction toward the housing and projecting from the receiving member.

2. A sealing arrangement according to claim 1, wherein the connecting element is developed as a pin-form plug connector with regions of different dimensions which are disposed along a common axis.

3. A sealing arrangement according to claim 2, wherein the connecting element is implemented rotationally symmetrical to the axis with a first region, a second region and a third region, wherein the first region and the second region have each a constant outer diameter and the third region is developed in the form of a truncated cone, wherein the first region and the second region are disposed extending in each instance from one end of the connecting element to the third region.

4. A sealing arrangement according to claim 3, wherein a lateral surface of the third region of the connecting element is developed as a sealing facing with constant angle between a surface line and the axis.

5. A sealing arrangement according to claim 3, wherein a diameter of a base area and a diameter of a top area of the truncated cone-form third region of the connecting element are each greater than the diameter of the first region and the diameter of the second region of the connecting element.

6. A sealing arrangement according to claim 3, wherein a first end side of the third region of connecting element is disposed such that it is oriented toward an interior of housing and a second end side is disposed oriented toward a surrounding of housing, wherein the first end side is developed with a greater diameter than the second end side.

7. A sealing arrangement according to claim 3, wherein the plug connector with the first region is disposed within the plug housing, with the second region such that it projects from the housing and with the third region within the passage bore developed in the housing.

8. A sealing arrangement according to claim 1, characterized in that the sealing element is developed in the form of a right hollow circular truncated cone with an axis.

9. A sealing arrangement according to claim 8, wherein the sealing element is disposed oriented with a first end side toward the interior of the housing and with a second end side toward the surrounding of the housing, wherein the first end side is developed with a greater diameter than the second end side.

10. A sealing arrangement according to claim 8, wherein the sealing element has an outer surface with conical form which is developed as a first sealing face with constant angle between a surface line and the axis.

11. A sealing arrangement according to claim 10, wherein the sealing element with the first sealing face is disposed so as to be in contact on housing.

12. A sealing arrangement according to claim 8, wherein the sealing element has an inner surface with conical form, which is developed as a second sealing face with predetermined angle between a surface line and the axis.

13. A sealing arrangement according to claim 12, wherein the sealing element with the second sealing face is disposed so as to be in contact on a sealing facing of a region of the connecting element.

14. A sealing arrangement according to claim 12, wherein the sealing element comprises a third sealing face which is disposed adjoining the second sealing surface in the proximity of a base area of the hollow circular truncated cone in the axial direction and which has a lesser angle between a surface line and the axis than the second sealing face.

15. A sealing arrangement according to claim 14, wherein the sealing element is disposed in contact with the third sealing face on an outer side of the wall.

16. A sealing arrangement according to claim 1, wherein the sealing element is implemented of a thermoset material.

17. A sealing arrangement according to claim 1, wherein the wall is developed in the form of a hollow circular cylinder and with a first end is fully connected with the receiving member over the entire circumference.

18. A sealing arrangement according to claim 17, wherein the wall in the proximity of a second end, developed distally to the first end, comprises a beaded rim-like shaping which extends fully about the wall over the entire circumference.

19. A sealing arrangement according to claim 1, wherein the wall on an inner side comprises centering guides for the centered insertion of the connecting element, which are disposed so as to extend in the axial direction and are developed projecting in the direction of an axis of wall.

20. A sealing arrangement according to claim 19, wherein on a wall at least three centering guides are developed which are uniformly distributed over the circumference.

21. A device for driving a compressor of a gaseous fluid, comprising a rotor and a stator, disposed extending along a common longitudinal axis, as well as a housing, wherein on a first end side, oriented in an axial direction, of the stator a support member with at least one receiving member for at least one plug housing is in contact, wherein the receiving member comprises at least one connection passage with a wall for receiving at least one connecting element and the device is developed with a sealing arrangement according to claim 1.

22. A device according to claim 21, wherein the support member with the at least one receiving member for the at least one plug housing is developed as a coherent unit and single-part component.

23. A method for assembling the device for driving a compressor of a gaseous fluid according to claim 21, comprising the steps of:

pressing in each instance at least one sealing element and one plug connector into a truncated cone-form passage aperture developed in a housing, and inserting the at least one plug connector, starting from an upper side of a receiving member, through at least one connection passage developed in the receiving member, into a connection of a plug housing, disposed in the receiving member, during the assembly of a stator with a support member in the housing, wherein in each instance a wall, encompassing the connection passage, of the receiving member, is slid into the sealing element such that the sealing element fully encloses the wall over the entire circumference.

24. A method according to claim 23, wherein the wall with a beaded rim-like shaping developed on an outer side is slid into the sealing element such that the sealing element with a third sealing face is fully in contact over the entire circumference on the shaping and the third sealing face encompasses the shaping.

25. A method according to claim 23, wherein a rotor and the stator are disposed on a common longitudinal axis such that the stator encompasses the rotor in the radial direction.

26. A method according to claim 23, wherein a support member with the receiving member is disposed on a first end side, oriented in an axial direction, of stator.

27. A method according to claim 23, wherein the plug housing is inserted into the receiving member developed on the support member and in this manner is fixed on the support member.

28. A method for driving a compressor for the compression of a gaseous fluid comprising compressing a fluid with the device of claim 21, wherein the fluid is a refrigerant in a refrigerant circuit of a climate control system of a motor vehicle.

* * * * *